May 28, 1940. F. W. SEYBOLD 2,202,434
COMPOSING ROOM SAW
Original Filed May 21, 1936 4 Sheets-Sheet 3
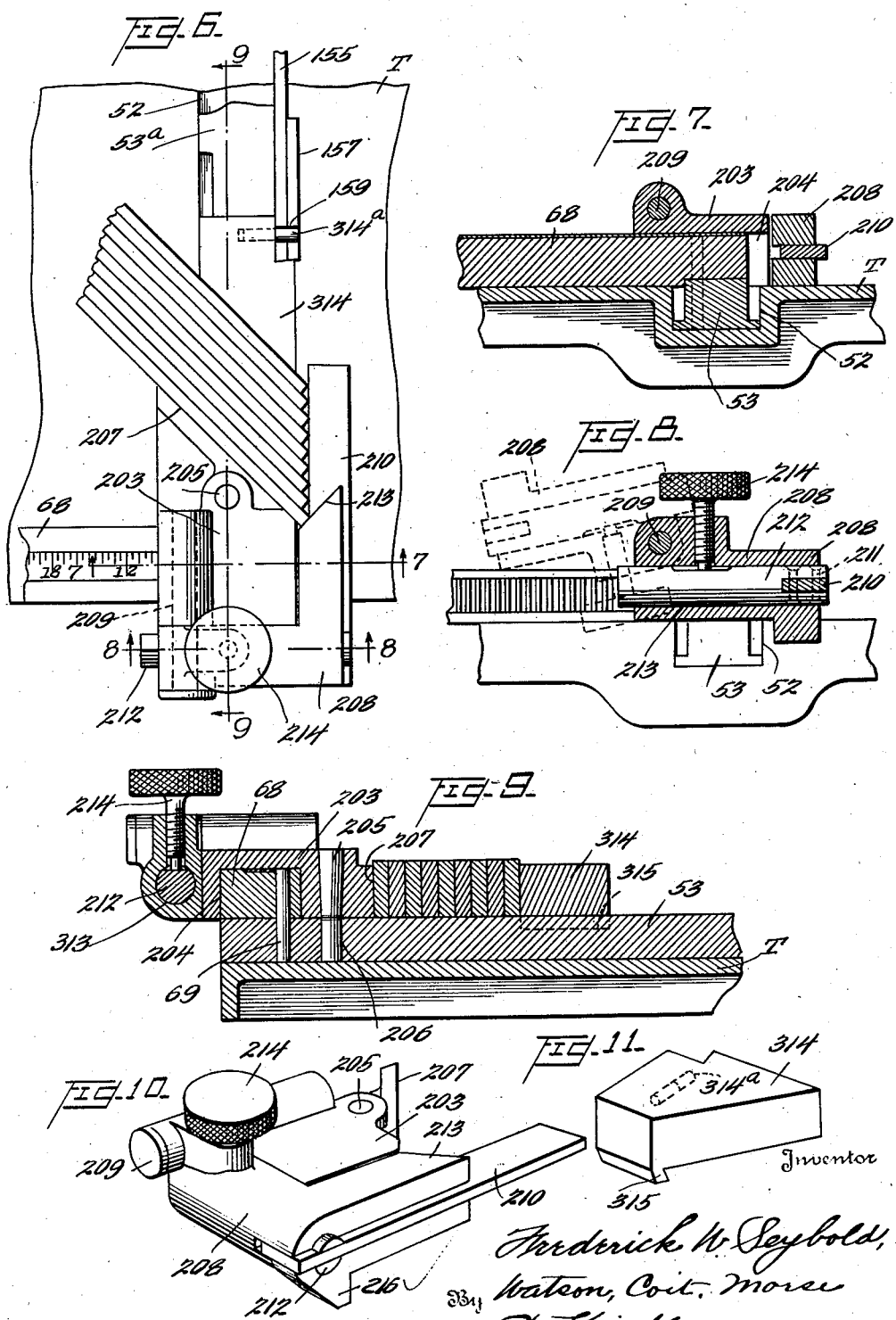

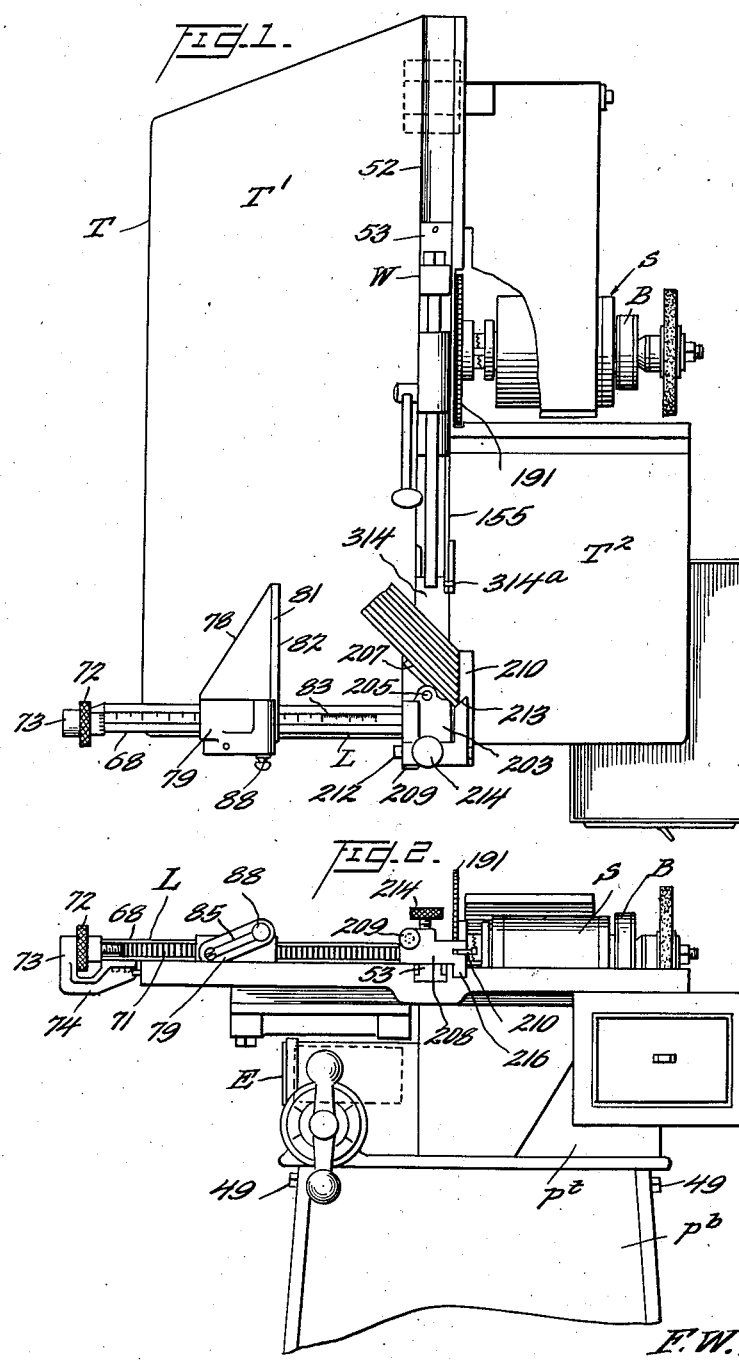

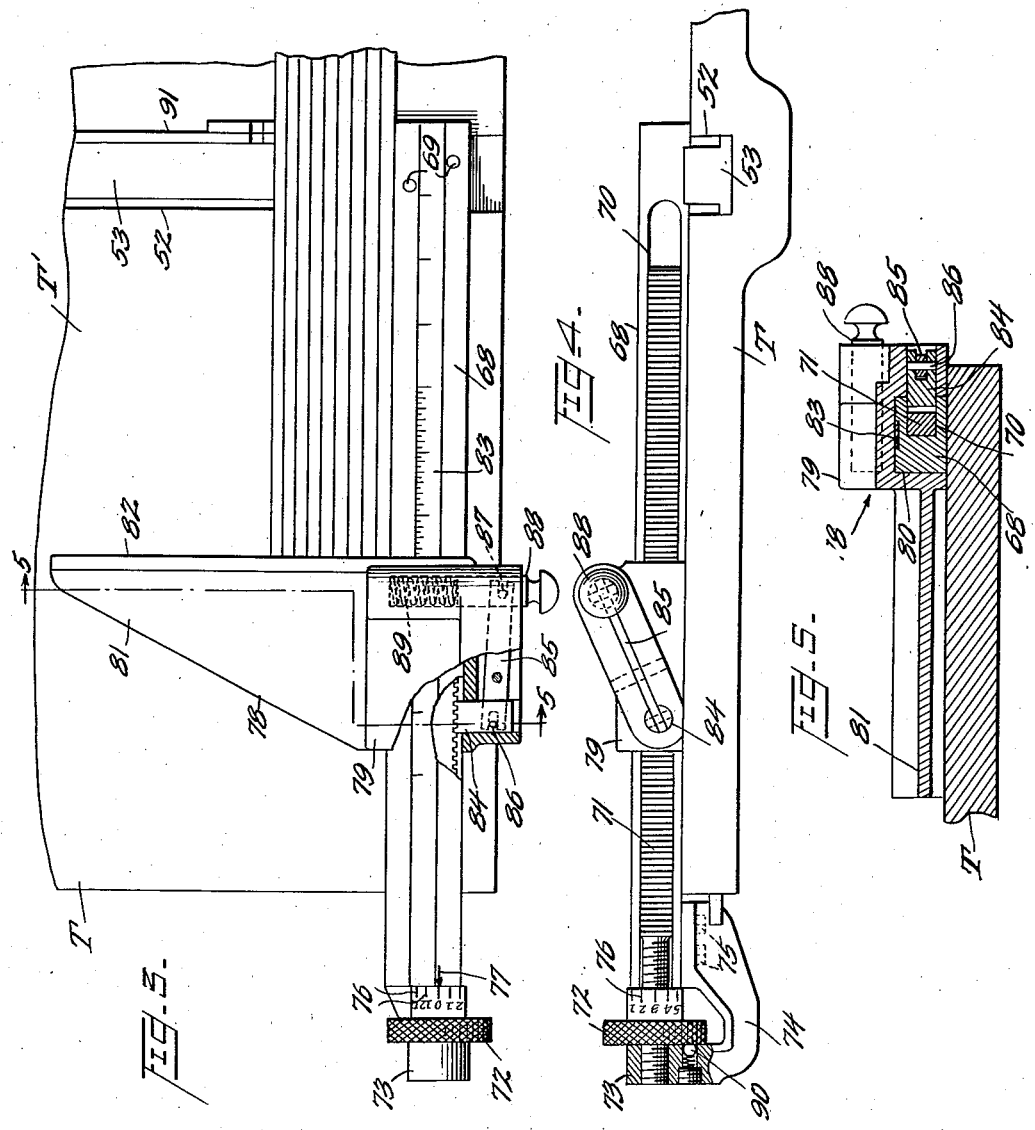

May 28, 1940.　　　F. W. SEYBOLD　　　2,202,434
COMPOSING ROOM SAW
Original Filed May 21, 1936　　　4 Sheets-Sheet 4
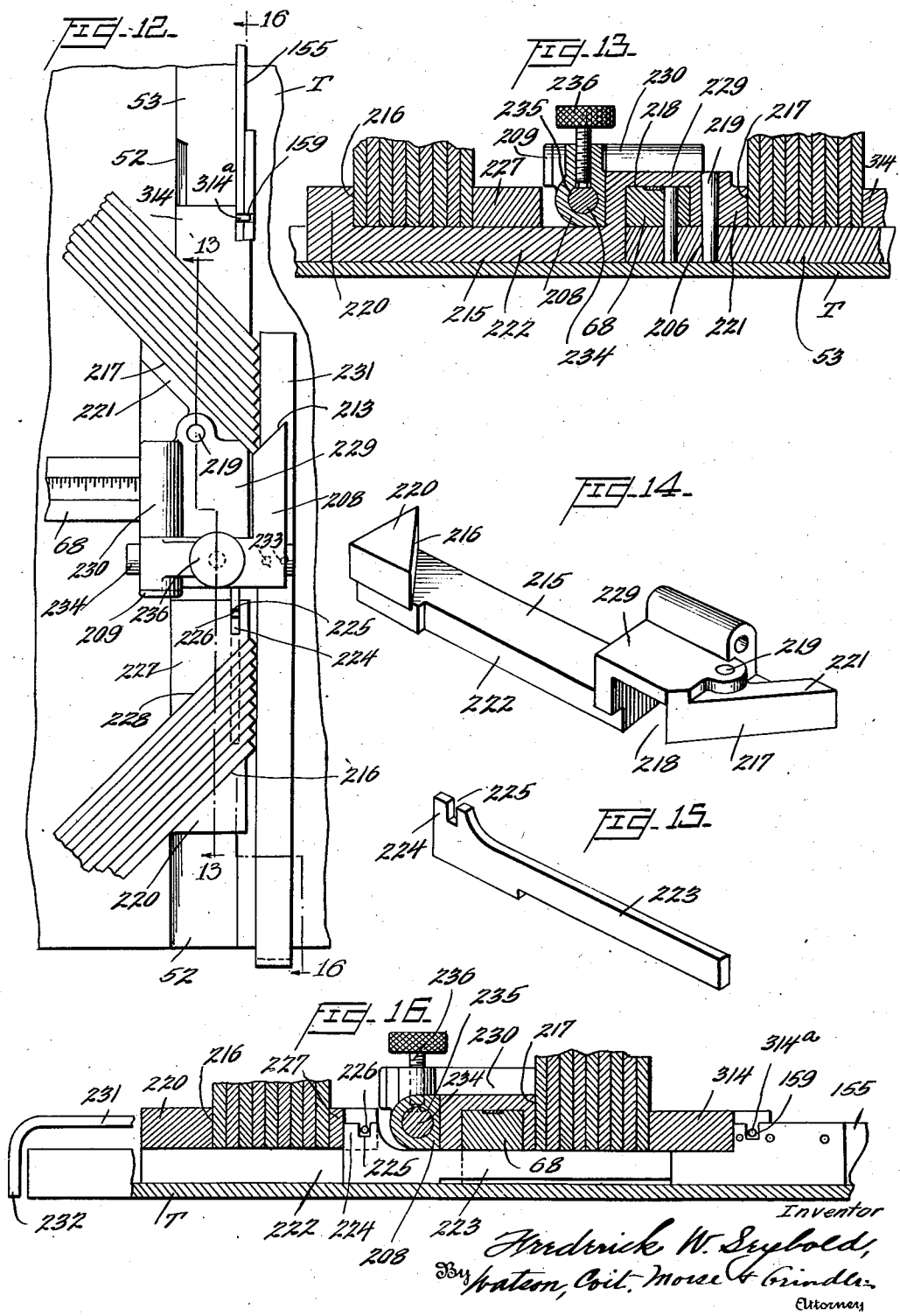

Patented May 28, 1940

2,202,434

UNITED STATES PATENT OFFICE 2,202,434

COMPOSING ROOM SAW

Frederick W. Seybold, Westfield, N. J., assignor to American Type Founders Incorporated, Elizabeth, N. J., a corporation of New Jersey Original application May 21, 1936, Serial No. 81,069. Divided and this application March 12, 1937, Serial No. 130,604

19 Claims. (Cl. 29—69)

The present invention relates to metal saws, and more particularly to composing room saws.

The main object of the present invention is to provide an improved mitering device that requires no mental calculation or laborious setting of gauges.

Another object is to provide an improved face-up mitering device that enables the operator to cut right hand and left hand miters at the same time.

Other objects and features of novelty will be apparent from the description taken in connection with the drawings in which, Fig. 1 is a plan view of a machine constructed in accordance with this invention as adjusted to miter one end of a series of metal rules;

Fig. 2 is a front elevation of the machine as illustrated in Fig. 1;

Fig. 3 is a top plan view of the front portion of the table illustrating the pica gauge and work clamped against the same to be cut to a definite length;

Fig. 4 is a front elevation of the parts shown in Fig. 3;

Fig. 5 is a sectional elevation taken substantially on the line 5—5 of Fig. 3 looking in the direction indicated by the arrows;

Fig. 6 is a fragmentary plan view illustrating the miter gauge holder and associated parts;

Fig. 7 is a sectional elevation taken substantially on the line 7—7 of Fig. 6 and looking in the direction indicated by the arrows;

Fig. 8 is a sectional elevation taken substantially on the line 8—8 of Fig. 6 and looking in the direction indicated by the arrows;

Fig. 9 is a sectional elevation taken substantially on the line 9—9 of Fig. 6 and looking in the direction indicated by the arrows;

Fig. 10 is a perspective view of the miter block, miter gauge holder and miter gauge assembly;

Fig. 11 is a perspective view of the miter clamp;

Fig. 12 is a fragmentary plan view illustrating the face-up mitering device;

Fig. 13 is a sectional elevation taken substantially on the line 13—13 of Fig. 12 and looking in the direction indicated by the arrows;

Fig. 14 is a perspective view of the face-up miter block;

Fig. 15 is a perspective view of the face-up miter gauge clamp plate; and

Fig. 16 is a sectional elevation taken substantially on the line 16—16 of Fig. 12 and looking in the direction indicated by the arrows.

In order to aid in an understanding of the invention, before describing the machine and attachments in detail, the main parts and arrangement will be pointed out first. Thus, referring to Figs. 1 and 2, the machine in general comprises a pedestal consisting of the bottom member $P^b$ of sheet metal in the form of a hollow frustrum of a pyramid, a hollow top member $P^t$ rigidly secured to, and supported on the top of, said bottom member in any suitable manner, as by bolts 49, a table T disposed above said top member and means carried by said top member and indicated in general by the reference letter E to raise and lower said table. Mounted to cooperate with work on the table is the saw assembly indicated in general by S, consisting in general of the saw, driven pulley, grinding wheel, and bearings for the assembly. Located within the pedestal is a motor not shown designed to drive the saw assembly by means of the belt B.

The main portion T of the table is formed with a slot or guideway 52 parallel and adjacent to the cutting plane of the saw 191. In this guideway is disposed a slide 53 on which is mounted the work holding clamp indicated in general by the reference letter W. At the front end of the slide 53 a pica gauge assembly L is rigidly secured extending at right angles to the length of the slide. The work is adapted to be clamped between the bar of the pica gauge and the work holding clamp W.

Referring to Figs. 3 to 5, inclusive, the pica gauge comprises a bar 68 rigidly secured, as by means of the pins 69, to the front end of the slide 53 in such manner that the bar rests on the top surface of the table and is slidable thereon together with the slide 53. The bar 68 is formed with a recess 70 extending substantially throughout the length of the bar and open at its front side and the end opposite the slide 53. Slidably disposed within this recess is a gauge rack 71 having rack teeth facing the open side of the recess 70. These teeth have a pitch a multiple of a "point," the unit of the printer's system of measurement. The left hand end of the gauge rack, as viewed in Fig. 4 is threaded and has a point gauge wheel 72 thereon disposed between the end of the gauge bar 68 and the collar 73 integral with the bracket 74 secured to the underside of the end portion of the gauge bar as by means of cap screws 75. The gauge wheel 72 is provided with graduations 76 cooperating with a fixed index 77 on the top of the gauge bar. The graduations indicate the subdivisions of one revolution of the wheel 72, it preferably being graduated into 12 divisions or points.

Mounted for sliding movement on the gauge bar is the pica gauge 78. As shown, it comprises a body portion 79 having a recess 80 in the bottom thereof adapted to straddle the gauge bar 68 and slidable thereon. The body 79 has an extension 81 provided with a work contacting surface 82 extended at right angles to the length of the gauge bar and parallel to the cutting plane of the saw. The gauge as a whole is adjustable along the length of the gauge bar and for the purpose of indicating any setting of the same a pica scale 83 is set into the top of the gauge bar. Means is provided in the body of the gauge cooperating with the rack teeth to lock the gauge at any desired point along the gauge bar. As shown, a gauge rack pin 84 is slidably mounted in the body 79 and has teeth at one end cooperating with the teeth of the rack 71. A gauge link 85 is pivoted intermediate its ends in a recess at the front side of the pica gauge body 79 and has one end slotted and engaging a pin 86 on the rack pin 84. The opposite end of the link is also slotted and engages a pin 87 on the slidable gauge knob 88. This knob is normally pressed outwardly by the spring 89 which pressure through the link tends to hold the rack pin 84 in engagement with the rack 71. To disengage the rack pin from the teeth of the rack the gauge knob 88 is pushed inwardly against the resistance of the spring 89.

To cut rules or the like to any desired length, the gauge 78 is set with its right hand edge coinciding with the desired length as indicated by the pica scale 83, by depressing the gauge knob 88 and moving the pica gauge to the desired setting then releasing the knob so that the gauge will be locked to the gauge rack. If the setting involves less than a pica, then the gauge wheel 72 is turned one way or the other to give the fractional or "point" setting. The gauge wheel is yieldingly held in the adjusted position by the ball detent 90. The work is placed against the rear face of the gauge bar with the left hand ends thereof abutting the work contacting surface 82 of the gauge and clamped in this position by moving the clamp plate 91 to clamp the work between the latter and the gauge bar. The slide together with the parts connected therewith and the work is then moved so that the work comes in contact with the saw and is cut to length thereby.

Referring to Figs. 6 to 11, inclusive, the miter device according to the present invention includes a miter block 203 formed with a transverse groove 204 so that the block may be placed on the pica gauge bar 68 straddling the same and with a pin 205 carried by the miter block fitting in the hole 206 of the slide 53. The block is also provided with a work contacting face 207 inclined at an angle of 45° to the plane of the saw cut. A miter gauge holder 208 is pivoted on the pin 209 carried by the block 203 so that the holder may be swung from the full line position shown in Figs. 8 and 10 to the dotted line position shown in Fig. 8. A gauge adapted to contact the to-be-cut ends of the pieces of the work and position the same is carried by the gauge holder 208 and consists of a plate 210 laterally slidable in a slot in the holder and secured as by means of pins 211 to the end portion of a pin 212 axially adjustable, and fitting, in a bore 213 in the holder. The gauge may be locked in any adjusted position by the set screw 214 engaging the pin 212.

The miter device permits mitering one end of either brass or metal rules face up and the other end face down. It involves no mental calculations or laborious setting of gauges. No screws or tools are used in placing the device in operative position. The mitering process is accomplished with a minimum of effort, yet the results, from the standpoint of accuracy and time saving will satisfy the most exacting demands.

Having cut the rules to the proper over all length, the pica gauge bar 68 is brought to the extreme front of the table and the set screw 214 loosened so that the miter gauge 210 is free. One piece of the rules to be mitered is inserted against the work contacting face 207 of the miter block so that the end of the rule abuts firmly against the bevel 213 on the miter gauge holder. Previous to this, the miter clamp 314 shown in Fig. 11 has been placed in the position shown in Fig. 6 with its pin 314ª disposed in the notch 159 of the clamp plate 155. This miter clamp is provided with a downwardly extending flange 315 at one edge of its bottom surface adapted to fit between the slide 53 and the adjacent surface of the slot 52 in the table to relieve the slide of side thrust due to the clamping of the work.

The work clamp W with the miter clamp 314 is now moved so that the rule is clamped between the clamp 314 and the work contacting surface 207. The miter gauge 210 is adjusted toward the left as viewed in Fig. 6 until it comes into contact with the end edge of the rule and is then locked in this adjusted position by means of the set screw 214. The single rule which has been held for setting purposes is now unclamped and the rules to be mitered are inserted face up between clamp 314 and the rule already against contact surface 207. These rules are now clamped with their ends touching the miter gauge 210 and the miter gauge holder 208 is swung to the position indicated in dotted lines in Fig. 17. This operation releases the safety stop 216 which, if the gauge holder were not swung about pin 209, would strike the end of the table if it were attempted to move the slide and work toward the saw.

The face-up miter device, illustrated in Figs. 12 to 16 inclusive, enables the operator to cut both right hand and left hand miters face up at the same time. The ease of operation and precision of work are the same as in the regular miter device.

This right hand and left hand miter attachment includes a double miter block 215 provided at its opposite ends with the work contacting surfaces 216 and 217, oppositely inclined at 45° to the cutting plane of the saw. Means is provided to removably secure the block to the slide 53. For this purpose the block is formed with a transverse slot 218 adapting the block to be placed over the pica gauge bar 68 and straddling the same, the front end of the miter block being provided with a pin 219 adapted to fit in the aperture 206 in the slide. The two abutments 220 and 221 having the work contacting surfaces thereon are connected by the neck or slide portion 222 adapted to slide in the slot 52 of the table.

The miter clamp 314 (Fig. 11) is placed in position on the slide 53 with its pin 314ª engaging in the notch 159 of the clamp plate 155. An extension clamp plate 223 is disposed in the cut away portion of the slide and extends under the body portion 229 of the miter block. One end of this extension clamp plate abuts the end of the clamp plate 155 and its other end is provided with the upstanding portion 224 formed with a notch 225 receiving the pin 226 of the face-up miter gauge clamp 227 interposed between the body portion 229 and the work which contacts the surface 228 disposed parallel to the work contacting surface 216 of the double miter block.

The body 229 is provided with a bearing 230 for the pin 209 swingingly supporting the miter gauge holder 208. This holder is constructed similar to the holder 208 shown in Fig. 10 except that it does not have the safety lug 216. The holder is adapted to receive a gauge consisting of the plate 231 laterally slidable in a slot in the holder in the same manner as the gauge 210 of Fig. 10. The plate 231 is much longer than the plate 210 and extends to the front of the table where it is provided with a downwardly projecting portion 232 adapted to act as a safety device by engaging the end of the table and preventing movement of the work and miter device toward the saw, if the gauge plate 231 with its holder has not been swung out of the way about the pin 209. The plate 231 is secured, as by means of pins 233, to the end portion of the pin 234 axially adjustable, and fitting, in a bore 235 in the holder. The gauge plate may be locked in any adjusted position by the set screw 236 engaging the pin 234.

In order to mount and operate the face-up miter device, the rules to be mitered are first cut to exact outside measure. Then the pica gauge bar 68 is brought to within about six inches of the front of the table. The miter clamp plate 223 is inserted in the groove in the slide 53 under the pica bar, with its wide end 224 toward the front of the table. Next, the face-up miter block 215 is placed so that it straddles the pica gauge bar and its dowel pin 219 fits the hole 206 in the slide. Now the miter clamp 314 is placed on the slide so that the clamp pin 314ª engages the notch 159 in the clamp plate 155 of the work holding device and the tongue 315 (Fig. 11) drops into the groove of the slide. The face-up miter gauge holder 208 is swung so that the miter gauge 231 is at the right side of the slide. Next the face-up miter clamp 227 is placed so that its pin 226 engages in the slot 225 of the miter clamp plate. The set screw 236 is now loosened so that the face-up miter gauge 231 is free. One piece of the rules to be mitered is inserted against the surface 217 of the miter block so that the end of the rule abuts firmly against the bevelled edge 213 of the miter gauge holder 208. This rule is now clamped by means of the work holding clamp W, taking care that the position of the rule is not disturbed. The miter gauge 231 is now adjusted toward the left until it comes into contact with the end of the clamped rule, whereupon it is secured in this position by turning the set screw 236. Now the rule held for setting purposes is unclamped and the clamp opened to receive rules to be mitered. Half the rules are placed face-up between the miter clamp 314 and the adjacent work contacting face 217 of the miter block, and the other half face-up between the miter clamp 227 and the work contacting surface 216 of the miter block, making sure that all the rules touch the gauge 231. The work is now clamped by means of the work holding clamp. Operation of this work holding clamp through clamp plate 155 moves miter clamp block 314 into engagement with the work, and the end of clamp plate 155 engaging the end of the extension clamp plate 223 also moves the miter gauge clamp 227 into engagement with the work disposed in front of the gauge bar 68. The miter gauge holder 208 with its miter gauge is now swung in a counterclockwise direction to take the gauge out of the path of the saw and raise the safety lug 232 so that the slide may be moved toward the saw.

To miter the opposite ends of the rules, the work is unclamped and the rules transposed with respect to the gauge bar 68, face-up, reclamped and their ends cut after having swung the gauge holder out of the way.

This application is a division of my application Serial No. 81,069, filed May 21, 1936.

Although an embodiment of the invention has been described in detail, it is to be understood that the invention is not thus limited but includes modifications and changes that come within the scope of the following claims.

Having thus described the invention, what is claimed as new and desired to be secured by Letters Patent is:

1. A machine of the character described in combination, a saw, a table having a groove parallel to the cutting plane of said saw and a slide therein, a pica gauge bar rigidly secured to the top face of said slide at the front end thereof and extending at right angles thereto, a miter block having a work contacting surface, means to removably secure the block to the slide and straddling said bar, means carried by the block and movable from operative to inoperative position and adapted when in operative position to engage and position the ends of the pieces of work, and means on the slide to clamp the work against said work contacting surface.

2. A machine of the character described including in combination, a saw, a table having a groove parallel to the cutting plane of said saw and a slide therein, a pica gauge bar rigidly secured to the top face of said slide at the front end thereof and extending at right angles thereto, a miter block having a work contacting surface, means to removably secure the block to the slide and straddling said bar, a miter gauge holder pivoted on said block for movement from operative to inoperative position out of the cutting plane of the saw, means on said holder to hold the block and slide from movement toward the saw when the holder is in operative position, a miter gauge adjustably carried by said holder adapted when in operative position to engage and position the ends of the pieces of work, and means on the slide to clamp the work against said work contacting surface.

3. The machine according to claim 2 wherein the means on the holder to hold the block and slide from movement toward the saw comprises a depending lug on said holder adapted to abut the front edge of the table when the holder is in operative position and to be moved to nonabutting position when the holder is swung to inoperative position.

4. As an article of manufacture a miter block having a transverse slot in its underface to fit a pica gauge bar and a vertical work contacting surface inclined at 45° to the center line of said slot, a miter gauge holder pivoted on said block for a movement about an axis perpendicular to the vertical plane containing the center line of said slot and a miter gauge adjustably carried by said holder.

5. A machine of the character described including in combination, a saw, a table having a grove parallel to the cutting plane of the saw and a slide therein, a pica gauge bar rigidly secured to the top face of said slide at the front end thereof and extending at right angles thereto, a miter block having two work contacting surfaces, means to removably secure the block to the slide and straddling bar with one of said surfaces on one side of said bar and the other surface on the other side, said surfaces being oppositely inclined at 45° to the cutting plane of the saw and a miter gauge holder pivoted on said block for movement from operative to inoperative position out of the cutting plane of said saw, a miter gauge adjustably carried by said holder adapted when in operative position to engage and position the ends of the pieces of work and means on said slide to clamp two separate units of work against said surfaces.

6. A machine of the character described including in combination, a saw, a table having a groove parallel to the cutting plane of the saw and a slide therein, a pica gauge bar rigidly secured to the top face of said slide at the front end thereof and extending at right angles thereto, a miter block having two work contacting surfaces, means to removably secure the block to the slide and straddling said bar with one of said surfaces on one side of said bar and the other surface on the other side, said surfaces being oppositely inclined at 45° to the cutting plane of the saw, a miter clamp spaced from each of said surfaces and having a corresponding inclined work engaging surface, and means to simultaneously actuate both clamps to clamp separate units of work against said work engaging surfaces of said block said last mentioned means including an element positively connecting the clamps.

7. The machine according to claim 5 wherein there is provided means to hold the block and slide from movement toward the saw only when the holder is in operative position.

8. The machine according to claim 5 wherein there is provided a depending lug movable with said holder and adapted to abut the front edge of the table to hold the block and slide from movement toward the saw only when the holder is in operative position.

9. A face-up miter attachment for machines of the character described including in combination, a miter block comprising a slide portion, an abutment at one end and on top of the slide portion having a vertical work contacting surface inclined at 45° to the length of the slide, a second abutment on top of the other end of the slide having a transverse slot therethrough to fit a pica gauge bar and a vertical work contacting surface inclined at 45° to the length of the slide and opposite to the first surface, a miter gauge holder pivoted on said second abutment for movement from operative to inoperative positions and a miter gauge adjustably carried by said holder adapted when in operative position to engage and position the ends of pieces of work held against said surfaces.

10. In a machine of the character described including in combination, a saw, a table, a structure reciprocable parallel to the cutting plane of the saw comprising a double miter block having an abutment provided with a work contacting surface inclined at 45° to said plane, a second abutment also having a work contacting surface inclined at 45° to said plane, oppositely with respect to the first surface and facing in the same direction, a work engaging clamp interposed between said surfaces, a second clamp, and means to actuate both clamps in the same direction to clamp units of work against said surfaces.

11. A machine of the character described including in combination, a saw, a table having a groove parallel to the cutting plane of the saw and a slide therein, a pica gauge bar rigidly secured to the top face of said slide at the front end thereof and extending at right angles thereto, a miter block having two work contacting surfaces, means to removably secure the block to the slide and straddling said bar with one of said surfaces on one side of said bar and the other surface on the other side, said surfaces being oppositely inclined at 45° to the cutting plane of the saw and facing in the same direction, a work engaging clamp interposed between said surfaces, a second clamp, and means to actuate both clamps in the same direction to clamp units of work against said surfaces.

12. A machine of the character described including in combination, a saw, a table having a groove parallel to the cutting plane of the saw, and a slide therein, a pica gauge bar rigidly secured to the top face of said slide at the front end thereof and extending at right angles thereto, a miter block having two work contacting surfaces, means to removably secure the block to the slide and straddling said bar with one of said surfaces on one side of said bar and the other surface on the other side, said surfaces being oppositely inclined at 45° to the cutting plane of the saw and facing in the same direction, a work engaging clamp interposed between said surfaces, a second clamp, means on the slide to move the second clamp to clamp a unit of work against one of said surfaces, and means to transmit such movement to the first clamp to clamp a second unit of work against the other surface.

13. A machine of the character described including in combination, a saw, a table having a structure slidable thereon in a direction parallel to the cutting plane of the saw, a miter block rigidly mounted on said structure having two spaced work contacting surfaces oppositely inclined at 45° to the cutting plane of the saw, interconnected miter clamps adapted to simultaneously clamp units of work against said surfaces, and a single device cooperating with said structure to lock both clamps in work clamping position.

14. As an article of manufacture a miter block having a transverse slot in its underface to fit a pica gauge bar and a vertical work contacting surface inclined at 45° to the center line of said slot, a miter gauge holder pivoted on said block for movement about an axis perpendicular to the vertical plane containing the center line of said slot, a miter gauge plate having an edge extending at right angles to said center line and supported on said holder for lateral adjustment, and means to lock the plate in an adjusted position.

15. A miter attachment for machines of the character described including in combination, a miter block adapted to be removably secured to the machine and having a work contacting surface, a miter gauge holder pivoted on said block for movement from operative to inoperative position, a miter gauge plate having an edge parallel to the axis of said pivot and supported on said holder for lateral adjustment, and means to lock the plate in an adjusted position.

16. A miter attachment for machines of the character described including in combination, a miter block adapted to be removably secured to the machine and having a work contacting surface, a miter gauge holder pivoted on said block for movement from operative to inoperative position and having a slot in its non-pivoted side, a gauge plate having an edge adapted to align the to-be-cut ends of the work slidably fitting in said slot for lateral adjustment, and means to lock the plate in an adjusted position.

17. A machine of the character described including in combination, a saw, a table having a groove parallel to the cutting plane of said saw and a slide therein, a pica gauge bar rigidly secured to the top face of said slide at the front end thereof and extending at right angles thereto, a removable miter block having a work contacting surface, cooperating means on the block, bar and slide to rigidly secure the block in a position with said surface extending from adjacent the cutting plane of the saw away therefrom at an angle of 45°, a miter gauge holder pivoted on said block for movement from operative position where a portion is in said cutting plane to an inoperative position out of the cutting plane of the saw, a miter gauge adjustably carried by said holder attached when in operative position to engage the to-be-cut ends of the pieces of work to properly position the same, and means on the slide to clamp the work against said work contacting surface.

18. A machine of the character described including in combination, a saw, a table having a groove parallel to the cutting plane of the saw and a slide therein, a pica gauge bar rigidly secured to the top face of said slide at the front end thereof and extending at right angles thereto, a miter block having two work contacting surfaces, means to removably secure the block to the slide and straddling said bar with one of said surfaces on one side of said bar and the other surface on the other side, said surfaces being oppositely inclined at 45° to the cutting plane of the saw, means to clamp a unit of work against one of said surfaces, and means positively connected to and actuated by the first means to simultaneously clamp a second unit of work against the other of said surfaces.

19. As an article of manufacture, a double miter block comprising an elongated slide portion, an abutment at one end and on top of the said slide portion having a vertical work contacting surface inclined at 45° to the length of the slide, a second abutment on top of the other end of the slide having a transverse slot therethrough to fit a pica gauge bar and a vertical work contacting surface inclined at 45° to the length of the slide opposite to the first surface and facing in the same direction, with respect to the longitudinal axis of the slide, as said first surface.

FREDERICK W. SEYBOLD.